United States Patent [19]
Rodgers, Jr.

[11] Patent Number: 5,690,589
[45] Date of Patent: Nov. 25, 1997

[54] STATIONARY EXERCISE APPARATUS

[76] Inventor: Robert E. Rodgers, Jr., 8011 Meadowcroft, Houston, Tex. 77063

[21] Appl. No.: 615,103

[22] Filed: Mar. 14, 1996

Related U.S. Application Data

[63] Continuation-in-part of Ser. No. 602,952, Feb. 16, 1996, which is a continuation of Ser. No. 377,846, Jan. 25, 1995, Pat. No. 5,573,480.

[51] Int. Cl.$^6$ .............................. A63B 69/16; A63B 22/04
[52] U.S. Cl. ................................... 482/57; 482/70; 482/51
[58] Field of Search .................................. 482/51, 52, 57, 482/70, 53, 58, 110

[56] References Cited

U.S. PATENT DOCUMENTS

| | | |
|---|---|---|
| 219,439 | 9/1879 | Blend . |
| 2,603,486 | 7/1952 | Hughes . |
| 3,316,898 | 5/1967 | Brown . |
| 3,432,164 | 3/1969 | Deeks . |
| 3,759,511 | 9/1973 | Zinkin et al. . |
| 4,053,173 | 10/1977 | Chase, Sr. . |
| 4,188,030 | 2/1980 | Hooper . |
| 4,379,566 | 4/1983 | Titcomb . |
| 4,456,276 | 6/1984 | Bortolin . |
| 4,509,742 | 4/1985 | Cones . |
| 4,555,109 | 11/1985 | Hartmann . |
| 4,561,318 | 12/1985 | Schirrmacher . |
| 4,645,200 | 2/1987 | Hix . |
| 4,679,786 | 7/1987 | Rodgers . |
| 4,720,093 | 1/1988 | Del Mar . |
| 4,869,494 | 9/1989 | Lambert, Sr. . |
| 4,900,013 | 2/1990 | Rodgers, Jr. . |
| 4,949,954 | 8/1990 | Hix . |
| 4,949,993 | 8/1990 | Stark et al. . |
| 4,989,857 | 2/1991 | Kuo . |
| 5,039,087 | 8/1991 | Kuo . |
| 5,039,088 | 8/1991 | Shifferaw . |
| 5,131,895 | 7/1992 | Rogers, Jr. . |
| 5,135,447 | 8/1992 | Robards, Jr. et al. . |
| 5,186,697 | 2/1993 | Rennex . |
| 5,242,343 | 9/1993 | Miller . |
| 5,290,211 | 3/1994 | Stearns . |
| 5,295,928 | 3/1994 | Rennex . |
| 5,299,993 | 4/1994 | Habing . |
| 5,383,829 | 1/1995 | Miller . |
| 5,401,226 | 3/1995 | Stearns . |
| 5,423,729 | 6/1995 | Eschenbach . |

FOREIGN PATENT DOCUMENTS

2919-494  5/1979  Germany .

*Primary Examiner*—Stephen R. Crow
*Attorney, Agent, or Firm*—Pravel, Hewitt, Kimball & Krieger

[57] ABSTRACT

A stationary exercising device which promotes cardiovascular exercise yet minimizes impact to critical joints. A base frame supports a pair of reciprocating members which are displaced in a horizontal direction parallel with the floor at one end yet reciprocate in a circular motion at the other end through a coupling system attached to the frame. Structure is included which permits each foot of the user to move in a generally elliptical path during the climbing exercise and also pivot while moving through the elliptical path. This provides for more natural movement of the knee and ankle joints minimizing unnecessary stress on the joints yet permitting a cardiovascular workout. The device may include linkage to facilitate a corresponding upper body exercise involving movement of the arm in which case each hand of the user is displaced along an arc or a substantially elliptical path, again promoting a more natural movement of the ankle, knee, elbow and shoulder joints and permitting a cardiovascular workout.

22 Claims, 5 Drawing Sheets

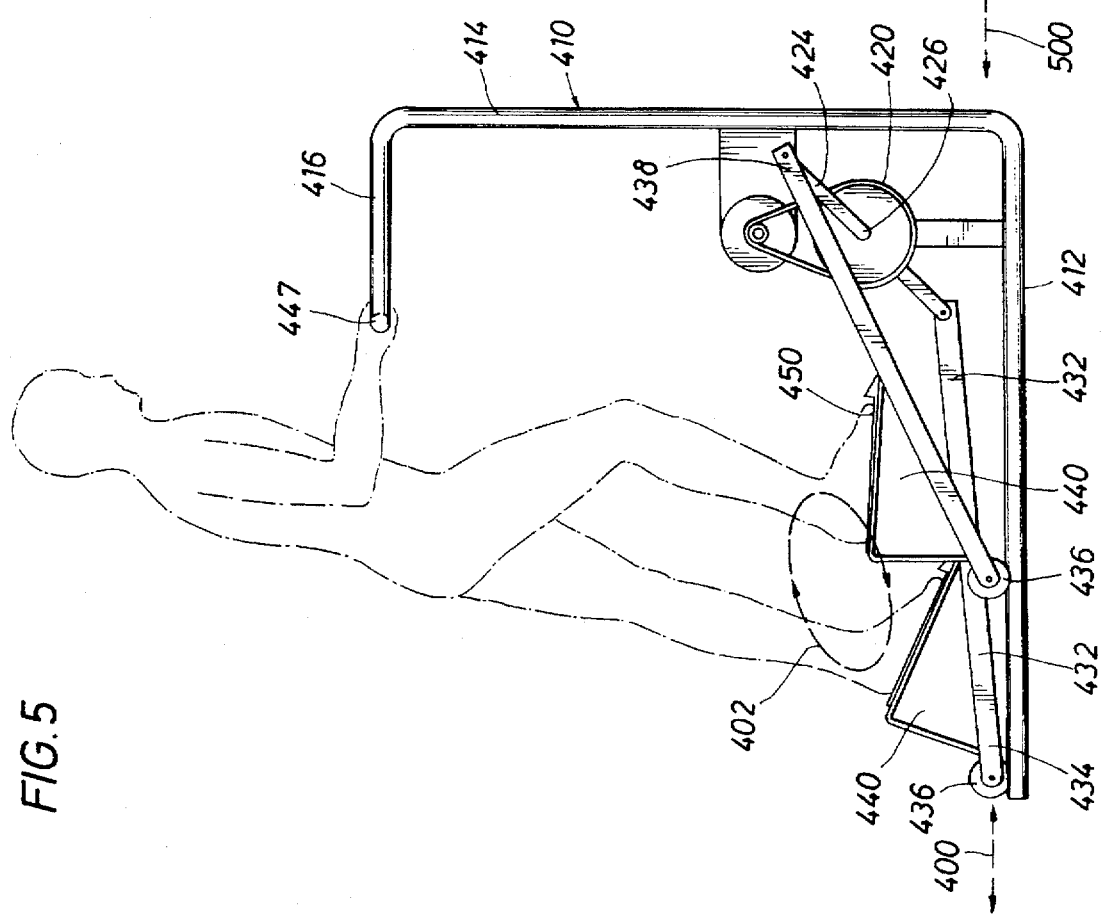

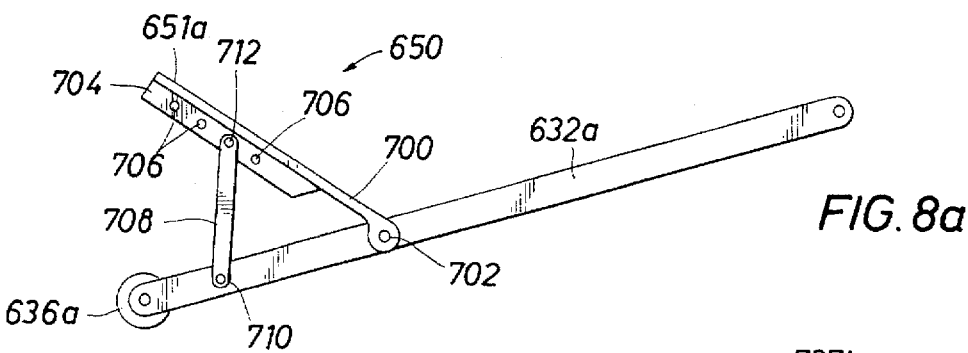
FIG. 8a
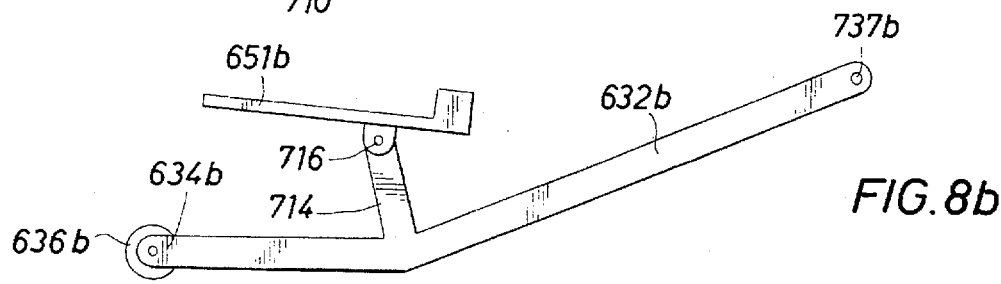
FIG. 8b
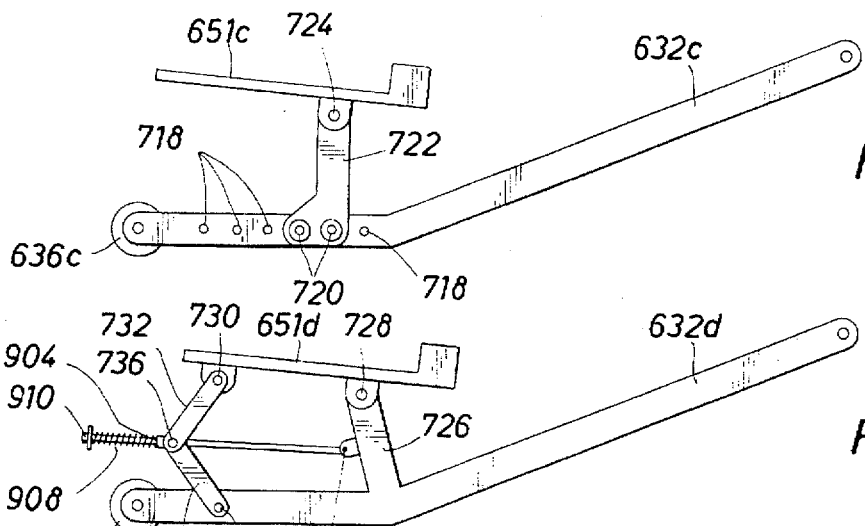
FIG. 8c
FIG. 8d
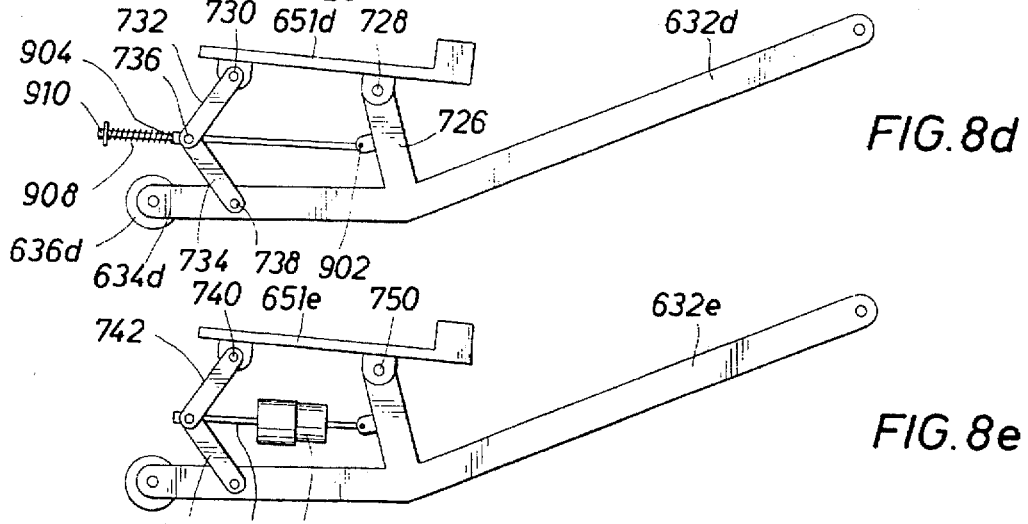
FIG. 8e
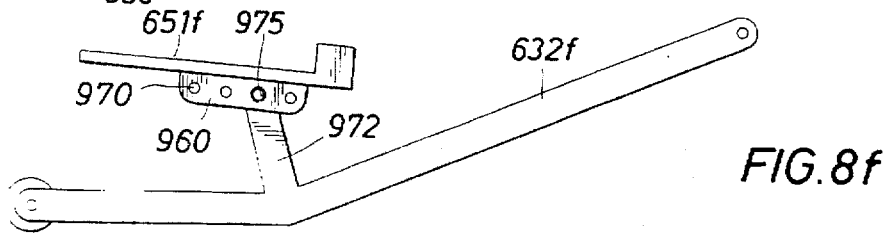
FIG. 8f

STATIONARY EXERCISE APPARATUS

RELATED APPLICATION

This patent application is a continuation-in-part of U.S. patent application Ser. No. 08/602,952 filed Feb. 16, 1996 which is continuation of U.S. patent application Ser. No. 08/377,846 filed Jan. 25, 1995, now U.S. Pat. No. 5,573,480.

BACKGROUND OF THE INVENTION

1. Field of the Invention

The present invention relates to an improved stationary exercising apparatus. More particular, the invention relates to an improved exercising apparatus which enables the user to move his feet in an elliptical path more accurately representing the body motion associated with climbing stairs or an inclined ramp.

2. Description of the Prior Art

Stair climbing is a popular form of exercise for the cardiovascular system. However, it can over prolonged use overstress the knees. Walking is also a popular form of exercise but it does not load the cardiovascular system to the extent stair climbing does. Therefore, the need exists for an improved stationary exercising device which will load the cardiovascular system as stair climbing does but does not overload or unduly stress the knees and other joints. Prior art stair climbing devices have two common draw backs. First, they require excessive lifting of the knees or an exaggerated vertical movement of the lower legs. See, for example, U.S. Pat. Nos. 3,316,898; 4,949,993; 4,989,857; and 5,135,477. Alternatively, the devices which do tend to promote a more natural movement of the knees and ankles are difficult to ascend and descend because of the configuration of the devices. See, for example, U.S. Pat. No. 5,242,343.

In addition, the need exists for a more rhythmic movement of the hand motions in combination with a stair climbing exercise to accelerate a cardiovascular workout and exercise the upper body muscle groups without unduly overstressing the elbows and shoulders. Hence, the need exists for an improved stationary exercise device which can combine the movements of the feet and hands in a more natural and rhythmic motion.

SUMMARY OF THE INVENTION

Briefly, the invention relates to an improved stationary exercising device. A frame is provided which includes a base portion adapted to be supported by the floor, a mid portion and a top portion. A coupling member is attached to the frame which includes a pulley defining a pivot axis. Two reciprocating members are positioned in spaced relationship to the base portion of the frame. One end of each reciprocating member is adapted for linear movement substantially parallel with the floor. That end of each of the reciprocating member being linearly displaced may contact the base portion or it may slide directly on the floor. The other end of each reciprocating member is attached, directly or indirectly, to the pulley of the coupling member. In this manner, rotation of the pulley rotates one end of each reciprocating member in a circular motion while the other end of each reciprocating member moves in a linear manner. Means are also included for orienting the bottom of each foot of the user so that each foot follows a substantially elliptical path during the operation of the apparatus.

Such means for orienting the bottom of the foot may include a linkage assembly for each reciprocating member. Each such linkage assembly comprises at least one link which is pivotally connected proximal one end between the two ends of the reciprocating member, closest to the end that is being displaced along the floor. This additional linkage is restrained at its other end within the base portion of the frame permitting the second end of the link only to move substantially parallel with the floor or base as is the case for the first and of each reciprocating member.

In the preferred embodiment, each linkage assembly includes a second link which is pivotally connected to the second end of the first link. The second link is then pivotally restrained to the top portion of the frame proximate its other end. This second link also provides for hand movement.

In another alternate embodiment, each linkage assembly includes a single member which is pivotally supported proximal one end to the reciprocating member closest to the end moving substantially parallel with the floor or base and is vertically restrained proximal its other end to the base portion of the frame.

In yet another alternate embodiment, each linkage assembly includes a single member having a foot contact portion and an elongated portion. One end of the single member is pivotally attached proximal the foot portion to a reciprocating member proximal the first end of the reciprocating member. The single member is then laterally restrained proximal its distal end to the top portion of the frame permitting a substantially elliptical movement of the foot portion with the reciprocating member yet limiting displacement of the upper portion to a rotational or angular movement coupled with the longitudinal movement of the upper portion relative to the frame.

In yet a further alternate embodiment, the means for providing substantially elliptical movement includes a pair of wedge members. One wedge member being attached to each reciprocating member proximal the first end of said reciprocating member being linearly displayed substantially parallel with the floor.

In yet another embodiment of the previous alternate embodiment, a linkage assembly is provided for each reciprocating member comprising two links, a first link being attached at one end to the first end of the reciprocating member being linearly displaced substantially parallel with the floor. The second end of the first link is pivotally attached to the first end of the second link. The second link is pivotally attached proximal to its other end to the top portion of the frame, and the other end of the second link includes a handle portion.

In yet another alternate embodiment of the previous two alternate embodiments the wedge member comprises a foot platform which is angularly adjustable providing a preferred orientation for muscle development while the feet of the user follow a preferred closed generally elliptical anatomical path.

The more important features of this invention have been summarized rather broadly in order that the detailed description may be better understood. There are, of course, additional features of the invention which will be described hereafter and which will also form the subject of the claims appended hereto.

BRIEF DESCRIPTION OF THE DRAWINGS

In order to more fully describe the drawings used in the detailed description of the present invention, a brief description of each drawing is provided.

FIG. 5 is an elevation view of yet another alternate embodiment of the present invention.

FIG. 6 is an elevation view of yet a further alternate embodiment of the present invention.

FIGS. 8a–8f are various alternate embodiments of the foot platform of the embodiment shown in FIG. 7.

DETAILED DESCRIPTION OF PRESENT INVENTION

Figure 1:
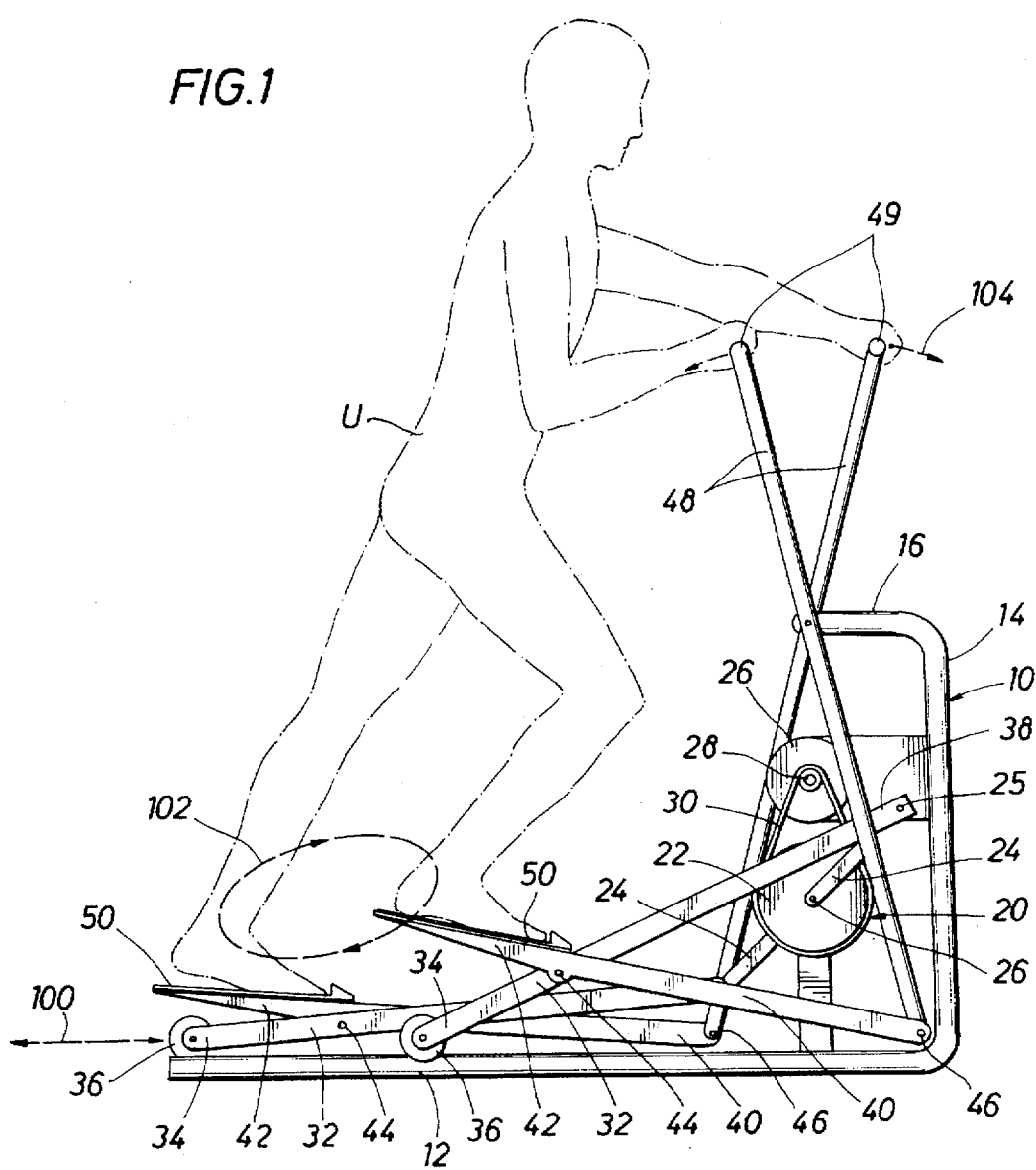
FIG. 1 is an elevation view of the preferred embodiment of the present invention.
Figure 2:
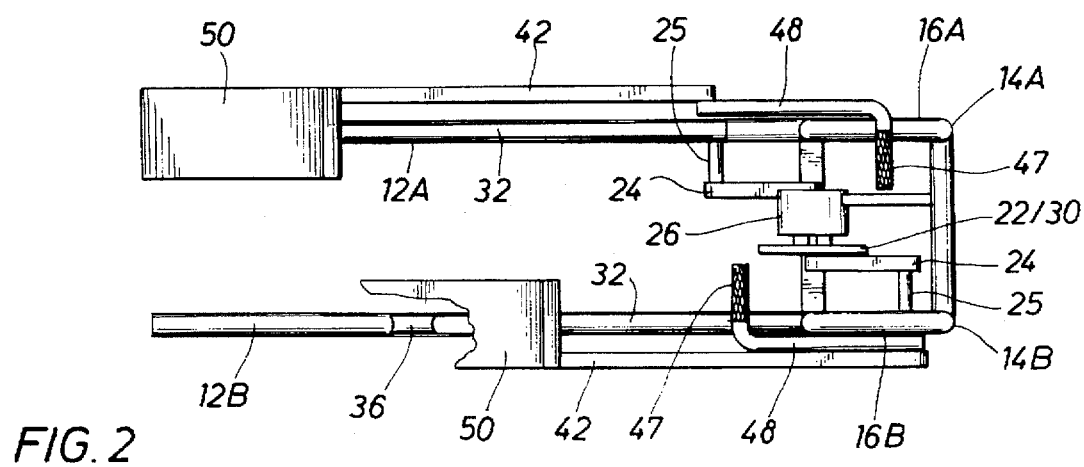
FIG. 2 is a plan view of the preferred embodiment of the present invention.

Referring to FIGS. 1 and 2, a frame 10 is shown comprising a base portion 12, a mid portion 14, and a top portion 16. Referring briefly to FIG. 2, the frame 10 comprises two bottom portions 12a and 12b, two mid portions 14a and 14b, and two top portions 16a and 16b. In essence, the frame is comprised of two separate bents "a" and "b". Obviously, variations can be made to frame 10 as disclosed without departing from the spirit of the invention.

A coupling system 20 is fixed relative to the frame and comprises a pulley 22, crank members 24, resistant brake 23, sheave 28 and belt 30. Two reciprocating members 32 are positioned in the lower proximity of frame 10. Each reciprocating member 32 has one end 34 which is adapted to move laterally in a linear direction as shown in FIG. 1. A roller 36 is mounted at each end 34 of reciprocating member 32 and is adapted, as shown in FIG. 1, to ride on base portion 12 of frame 10. Alternatively, roller 36 may directly engage the floor, if desirable. The other end 38 of each reciprocating member 32 is pivotally connected to one end of a crank 24. The pivotal connection at end 38 may be through a pivotal connection member 25 (see FIG. 2) which extends between the other ends 38 of reciprocating members 32 and cranks 24. The other end of crank 24 is attached to pulley 22 at the pivot axis 26 of the coupling system 20. The pivot axis 26 is the axis about which pulley 22 rotates.

In the preferred embodiment, the present invention also includes two foot members, or contact members, 40. Each foot member 40 is pivotally attached proximate a first end 42 through a pinned connection 44 to the reciprocating arm 32. A foot pad 50 is attached to the top surface of each foot member 40 at its first end 42. Each foot member 40 is pivotally attached at its other end 46 to an arm member 48. Each arm member 48 is also pivotally attached proximal its other end to the top portion 16 of frame 10. A handle portion 47 (see FIG. 2) is included at the top end 49 of each hand member 48. Referring to FIG. 2, it can be easily seen that the frame 10 comprises dual base portions 12A/12B, mid portions 14A/14B and top portions 16A/16B. Furthermore, it can be seen that reciprocating members 32, foot members 40 and arm members 48 provide identical dual systems; each system resting on a base portion 12A or 12B of the frame and each arranged to accommodate one foot and one arm of the user.

In the operation of the preferred embodiment the user "U" can ascend the present invention from the back or the sides which facilitate its use. In some prior art disclosures ascending and descending is difficult and cumbersome due to the location of the pulleys and other structures. See, for example, U.S. Pat. No. 5,242,343. However, in the case of the present invention it is easy to ascend and descend the device as there is a minimal amount of interference in the structure during exercise activity.

During operation, a climbing motion by the user results in the displacement of first ends 34 of each reciprocating member 32 in the direction of arrow 100. Similarly, a circulating motion occurs at the second end 38 of each reciprocating member 32. However at points between the opposite ends 34 and 38 of each reciprocating member 32, the motion gradually changes from a circular motion (at ends 38) to a linear motion the ends 34. This geometric transition occurs in the form of an approximate ellipse. It is not a perfect elliptical shape; and it tends to be slightly more egg-shaped. However, it provides a more natural and rhythmic body movement.

It appears that the preferred location of pinned connection 44 relative to the length of the reciprocating member 32 is in that ⅓ portion closest to the first end 34 of each reciprocating member 32. It is in this range that the movement of each foot of the user follows an elliptical path (as shown by approximate ellipse 102) which is the more natural and comfortable geometric motion of the ankle and knees, minimizing stress on these joints yet permitting continued cardiovascular exercise. During operation, the upper end 49 of each arm member 48 moves in an arc as shown by arrow 104. Such permits hand/arm/shoulder movements for exercising the upper body muscle groups while continuing the cardiovascular exercise.

Resistant brake 23 of coupling system 20 operates in a manner well known to those skilled in the art. Resistant brake 23 serves to increase or decrease the load on the pulley through the sheave 28/belt 30 arrangement. Thus, resistant brake 23 serves to increase or decrease the extent of the cardiovascular workout.

Figure 3:
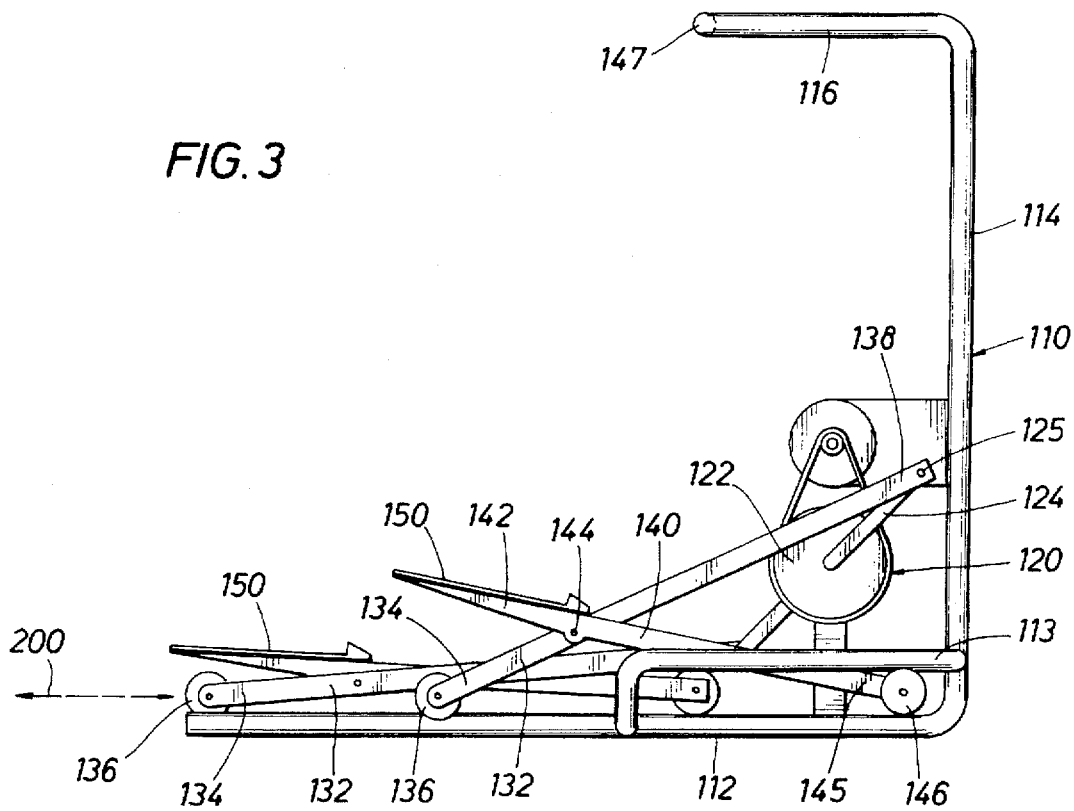
FIG. 3 is an elevation view of an alternate embodiment of the present invention.

Referring now to FIG. 3, an alternate embodiment of the present invention is shown. Identical two-digit reference numerals will be used to designate similar structure found in the preferred embodiment but with a 100 series prefix. Frame 110 comprises a lower portion 116, a mid portion 114, and a top portion 116. A coupling system 120 is included having identical components of the coupling system 20 described above for the preferred embodiment. Furthermore, coupling system 120 performs in an identical manner to coupling system 20 described above for the preferred embodiment.

A pair of reciprocating members 132 are also included, each having a first end 134 on which rollers 136 are mounted. The second end 138 of each reciprocating member 132 is pivotally connected via a pinned connection or pin member 125 to one end of each crank 124. Again, two foot members 140 are included, each being pivotally connected proximate a first end 142 at pinned connection 144 to a corresponding reciprocating member 132. Each foot member 140 also includes a foot pad 150 attached to the top surface of each foot member 140 at first end 142. In this embodiment, however, a roller 146 is attached to each foot member 140 at its second end 145. Each roller 146 engages a top bar 113 of frame 110. Each top bar 113 is connected at one end to mid portion 114 of frame 110 and its other end to base portion 112. In addition, the top portion 116 of each bent of frame 110 is connected by a bar 147 which is adapted to be held by the user during exercising to provide added stability.

In the operation of this alternate embodiment, the user ascends the device from the side or the rear with ease, places both feet on pads 150, grabs bar 147 and begins a stair climbing motion. At that point, first ends 134 of each foot member 140 are displaced in a linear manner in the direction of arrow 200, as in the case of the preferred embodiment. Similarly, as in the case of the preferred embodiment, ends 138 of each reciprocating member 132 move in a circular motion about pulley 122. Again, the change from a linear movement of first ends 134 of reciprocating members 132 and a circular movement of second end 138 of reciprocating member 132 is an approximate ellipse of varying shape. In this alternate embodiment, the second end 145 of each foot member 140 is restrained also to move linearly in the direction of arrow 200. Each roller 146 is restrained from vertical movement by means of bar 113. Thus, in this embodiment, the user does not employ an arm member as shown on the preferred embodiment. Rather, the user grabs the bar 147 for added stability.

Figure 4:
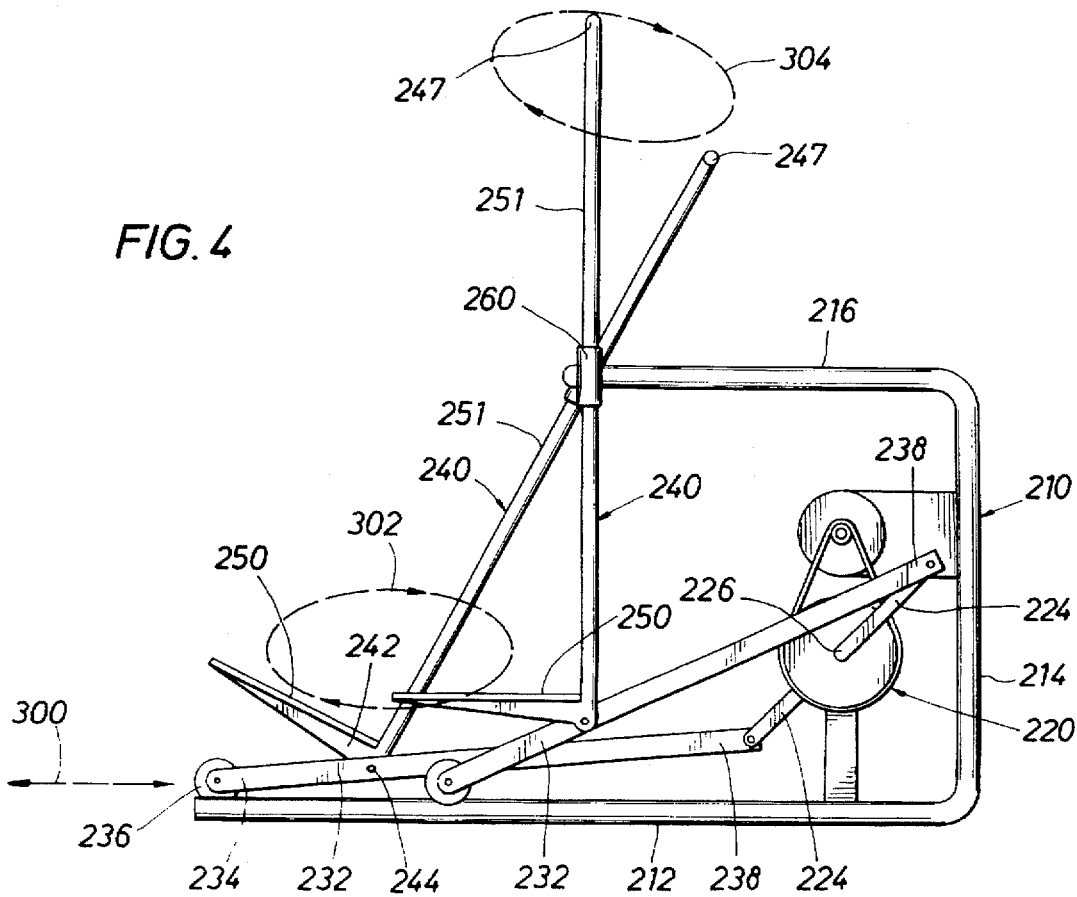
FIG. 4 is an elevation view of another alternate embodiment of the present invention.

Referring now to FIG. 4, another alternate embodiment of the present invention is shown. As before, similar parts will be designated by the same two-digit reference numeral as shown in the preferred embodiment but now with a 200 series prefix. Frame 210 again comprises a base portion 212, a mid portion 214 and a top portion 216. A coupler system 220 is also provided which is identical in structure and function to coupling system 20 of the preferred embodiment (FIGS. 1–2). This alternate embodiment also includes a pair of reciprocating members 232, each having a first end 234 which moves linearly in the direction of arrow 300 by means of rollers 236. As in the case of the previous embodiments, rollers 236 are shown engaging bottom portion 212 of the frame; however, they may slide along the floor rather than the base of the frame. Similarly, each reciprocating member 232 includes a second end 238 pivotally attached to one end of a crank 224. In this alternate embodiment two contact members 240 are included having a foot portion 250 angularly displaced from a longitudinal portion 251. Each contact member 240 is pivotally connected at a first end 242 via pinned connection 244 to a reciprocating member 232. This alternate embodiment also includes a sleeve 260 rotatably mounted to the top portion 216 of frame 210. Each sleeve 260 serves to laterally restrain longitudinal member 251 of contact member 240 permitting only axial (or longitudinal) movement of member 251 relative to sleeve 260 and angular movement of member 251 relative to the top portion 216 of frame 210.

In operation the user ascends the device from the side or the rear and begins the climbing motion using his feet engaging foot portions 250. The upper portion of each longitudinal member 251 includes a handle portion 247 which can be grabbed by the user. As in the case of the previous embodiments, the climbing motion results in a lateral or linear displacement of first ends 234 of each reciprocating member 232 in the direction of arrow 300. However, movement of the user's hands via handle portions 247 is not in an arc as described above with respect to the preferred embodiment or stationary as in the case of the first alternate embodiment. Rather, the path which the hands of the user takes in this alternate embodiment follows a generally elliptical path 304 as do the feet (see approximate elliptical path 302). Thus, this embodiment provides a more extensive cardiovascular exercise in that both upper and lower body motion occurs in a more natural and rhythmic pattern minimizing excessive stress on the ankle, knee, elbow, and shoulder joints.

Referring now to FIGS. 5 and 6, two further embodiments are shown. As in the case of the previous embodiments, similar structure will be referred to with the same two-digit reference numeral but with a different prefix. In the case of FIG. 5, the designated structure has a 400 series prefix and in the case of FIG. 6, the designated structure has a 500 series prefix.

Referring to FIG. 5, the frame 410 comprises a bottom portion 412, a mid portion 414 and a top portion 416. A coupler system 420 is shown which includes the same components and functions identically with the coupling system 20 of the preferred embodiment. Two reciprocating members 432 are included, each having a first end 434 to which a roller 436 is attached. The other end 438 of each reciprocating member 432 is pivotally connected to one end of a crank 424 of coupling system 420. The upper portion 416 of frame 410 includes a bar 447 to be grabbed by the user for stability. A wedge or block 440 is attached to the top of each reciprocating member 432 proximate its first end 434. Each block includes a foot pad 450.

As in the case of previous embodiments, the user ascends the device from the side or rear and begins a stair climbing motion by pressing downwardly on each foot pad 450. In this manner the first end 434 of each reciprocating member 432 is linearly displaced in the direction of arrow 400 and end 438 of each reciprocating member 432 is rotated about the pivot axis of 426 of coupling system 420. As in the previous embodiments, such a configuration permits each foot of the user to follow an elliptical path generally shown by approximate ellipse 402.

Referring now to FIG. 6, an alternate embodiment of the version depicted in FIG. 5 is illustrated. Frame 510 comprises base portion 512, mid portion 514 and top portion 516. Once again, a coupling system 520 is shown identical to that in structure and function of coupling system 420 in FIG. 5. Moreover, reciprocating members 532 and wedge members 540 and their interrelationship to coupling system 520 are identical to that depicted by elements 432, 440 and 420, respectively, of FIG. 5.

As in the case of the previous embodiments, operation of the device shown in FIG. 6 results in linear movement of first ends 534 of reciprocating members 532 in the direction of arrow 500. The difference in this alternate embodiment, however, is a pair of linkage assemblies (one for each reciprocating member 532) comprising a first link 547 and a second link 548. One end of link 547 is attached to roller 536 of each reciprocating member 532. First link 547 is pivotally connected at pinned connection 546 to second link 548. Second link 548 is pivotally connected proximate its other end to the top potion 516 of frame 510. The end of second link 548 distal said pinned connection 546 includes a handle portion similar to handle portion 47 of FIG. 2. As in the case of the embodiment shown in FIG. 5, the user of the device shown in FIG. 6 easily ascends the device from the side or the rear, grabs the handle portion and begins to exert downward pressure on the foot pad portions of each wedge or block 540 in a stair climbing motion. As in the previous embodiments, this results in a smooth substantially elliptical motion of each foot of the user as shown by approximate ellipse 502. It also results in the exercising of certain muscle groups in the upper body through rotation of the hands along the arc in the direction of arrow 504.

Figure 7:
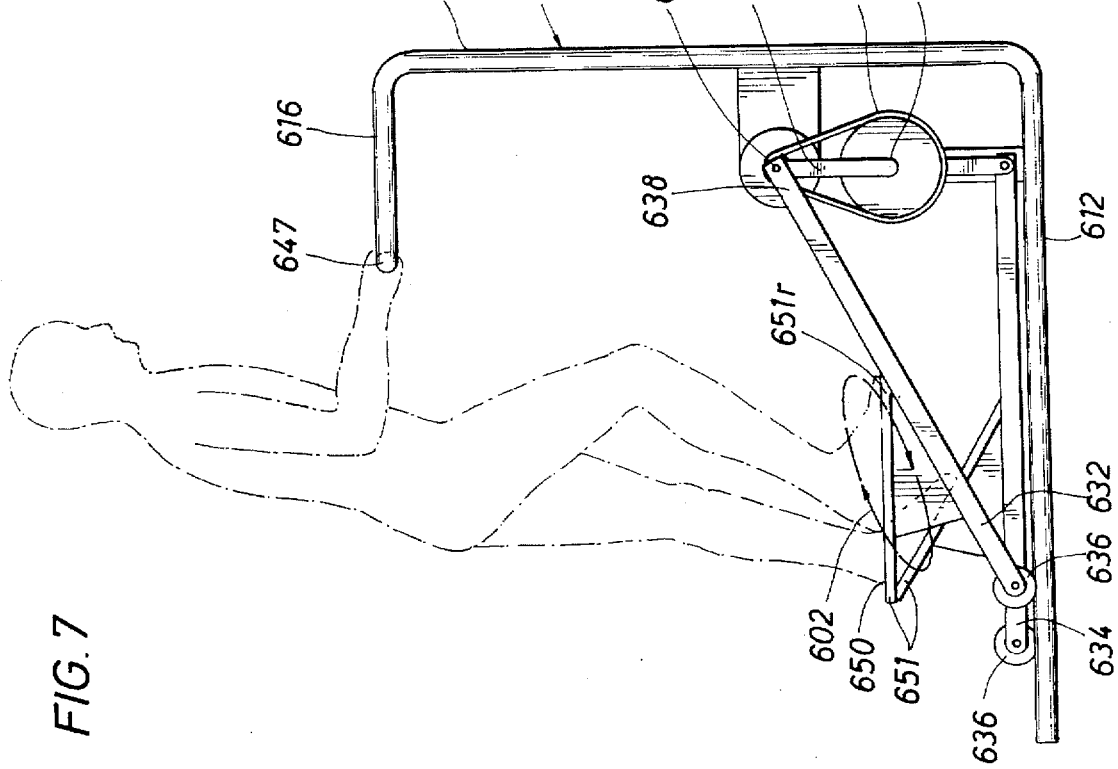
FIG. 7 is an elevation view of yet another embodiment of the present invention shown in FIG. 5.

Referring now to FIG. 7, yet another embodiment of the present invention as originally shown in FIG. 5 is illustrated. As before, similar parts will be designated by the same two-digit reference numeral as shown in the preferred embodiment but now with a 600 series prefix. Frame 610 again comprises a bottom or base portion 612, a mid portion 614 and a top portion 616. A coupling system 620 is included having identical components of the coupling system 20 described above for the preferred embodiment. Further, coupling system 620 performs in an identical manner to coupling system 20 described above for the preferred embodiment. In this alternate embodiment two reciprocating members 632 are shown, each one having an end 634 which is adapted to move substantially laterally along base portion 612. A roller 636 is mounted at the end 634 of each reciprocating member 632. The other end 638 of each reciprocating member 632 is pivotally connected to one end of a crank 624 of coupling system 620. The upper portion 616 of frame 610 includes a bar 647 to be grabbed by the user for stability. In this alternate embodiment a foot contact member 650 is attached to each reciprocating member 632 proximate end 634 of the corresponding reciprocating member 632. Each foot contact member 650 includes a foot platform 651 which is used to support and contact directly a foot of the user.

As shown in FIG. 7, each foot platform 651 is preferably aligned at an acute angle with respect to the longitudinal axis of the corresponding reciprocating member 632 which extends from the pivotal connection 637 at the end of the reciprocating member 632 attached to the coupling system 620 to roller 636 at the other end 634 of the corresponding reciprocating member 632. Thus, during use of the embodiment shown in FIG. 7, each foot platform 650 moves through an ovate or near elliptical path 602. The orientation of platform 651 is arranged so that when it is near the highest position as shown by the location of the right foot platform 651r in FIG. 7, platform 651r is substantially parallel to the ground. This is preferable to prevent rearward tilt of platform 651 as it progresses through path 602. Otherwise, the device may cause excessive loading of the calf muscle. As the right foot of the user moves through the bottom of path 602, the right heel lifts, allowing the user to generate more rearward thrust.

Referring now to FIGS. 8a–8f, various alternate embodiments of each foot contact member 650 of FIG. 7 are further illustrated.

With respect to FIG. 8a, foot contact member 650 comprises a contact platform 651a pivotally connected at end 700 via pivot connection 702 to reciprocating member 632a. A flange or channel member 704 is attached to the base of platform 651a and includes apertures 706. Platform 651a is adjustably supported by brace 708. One end of brace 708 is pivotally attached at pivot point 710 to reciprocating member 632a while the other end of brace 708 is engaged via a pin connection 712 through one of apertures 706. In this manner, the angle of platform 651a can be adjusted relative to the longitudinal axis of reciprocating member 632a. Thus, the pivotal angle of platform 651a remains acute relative to the longitudinal axis of member 632a. Such an adjustment can be made to accommodate the desired angle of inclination of the user while maintaining the preferred elliptical path 602 of FIG. 7.

Referring now to FIG. 8b, foot contact member 650 as shown in FIG. 7 may comprise an alternate embodiment as shown in FIG. 8b which includes a foot platform 651b pivotally mounted at pin connection 716 to nonlinear reciprocating member 632b having a platform support member 714. In this embodiment, foot platform 651b is free to pivot about pin connection 716 enabling the user to freely rotate platform 651b to any number of preferred acute angular positions relative to a line or axis extending from one end 637b of reciprocating member 632b to its other end 634b. Notwithstanding the angular orientation selected by the user, platform 651b will continue to maintain a closed substantially elliptical path 602 as shown in FIG. 7. As discussed above, such elliptical movement provides for preferred anatomical response minimizing damage and injury to the ankles and knees.

Referring now to FIG. 8c, another alternate embodiment of foot contact member 650 as shown in FIG. 7 is depicted. Reciprocating member 632c is generally the same nonlinear configuration as that of reciprocating member 632b of FIG. 8b except that it includes apertures 718 adapted to accommodate pin connections 720 which fixedly secure platform support member 722. As in the case of FIG. 8b, platform 651c is pivotally connected at connection 724 enabling the user to pivot platform 651c to the desired acute angular orientation. The embodiment shown in FIG. 8c is distinguishable from the embodiment shown in FIG. 8b in that the user may disengage pins 720 and reposition member 722 relative to member 632c by inserting pins 720 in other apertures 718. This changes the profile of closed elliptical path 602. As platform 651c is moved rearwardly towards roller 636c, elliptical path 602 is flattened thereby deemphasizing vertical movement of each platform 651c. This may be a preferred anatomical pattern for some users.

Referring now to FIG. 8d, a further improvement is shown over the embodiment of FIG. 8b. Once again, reciprocating member 632d is nonlinear and includes a platform support member 726 which, through pivotal connection 728, supports one end of platform 651d. The other end of platform 651d is supported by scissor members 732/734. Each scissor member 732 and 734 is pivotally connected to one another at connection 736. The other end of member 732 is pivotally connected at connection 730 to foot platform 651d. The other end of member 734 is pivotally connected at connection 738 to end 634d of reciprocating member 632d proximate roller 636d. A tensioning member 900 is pivotally attached at one end to member 726 through pin connection 902. The distal portion of member 900 is supported through a bushing arrangement 904 proximate pin connection 736. A spring 908 is placed over the portion of member 900 distal pin connection 902. A nut and washer arrangement 910 is then secured through a threaded portion on the distal end of member 900 to compress spring 908. In this manner, the operation of the embodiment shown in FIG. 8d is generally similar to the embodiment shown in FIG. 8b except that the pivotal motion of platform 651d is partially restrained by the compressive nature of spring 908. That is, downward pressure through the heel of the user against the rear portion of platform 651d adjacent pin connection 730 serves to compress or close the scissor members 732/734 thereby compressing spring 908. In this manner, free pivotal movement of platform 651d about pin connection 728 is somewhat restrained eliminating the possibility of any erratic pivotal motion of platform 651d.

Referring now to the embodiment shown in FIG. 8e, the arrangement therein is substantially identical to the embodiment shown in FIG. 8d except for the substitution of a shock/damper 920 in place of spring 908 of FIG. 8d. In this manner, shock/damper 920 serves to retard compressive and tensile forces. Thus, as the user exerts a heel load on platform 651e proximate pivot connection 740 the compressive force serves to compress or close scissor members 742 and 744. However, shock/damper 920 inhibits abrupt compressive loading of scissor members 742/744 by placing a tensile load on member 930. Similarly, if the user places an excessive toe load forward of pin connection 750 which serves to raise the heel portion of platform 651e, shock/damper 920 serves to inhibit a rapid extension of scissor members 742/744 by placing a compressive load on member 930. In this manner, pivotal motion of platform 651e about pin connection 750 is controlled. While pivotal motion is still permitted enabling the user to adjust the angle of platform 651e to the preferred acute angular orientation, the overall movement of both foot platforms remains on the generally elliptical path 602 of FIG. 7.

Finally, referring to FIG. 8f, an alternate embodiment is shown of a nonlinear reciprocating member 636f which is similar in configuration to the embodiment shown in FIG. 8b. The primary exception with respect to the embodiment of FIG. 8b is the inclusion of a flange 960 attached to the bottom of platform 651f having apertures 970. Platform support member 972 includes an aperture through which a pin 975 passes providing pivotal movement of platform 651f through one aperture 970 relative to member 972. The embodiment shown in FIG. 8f is a modification over the embodiment shown in FIG. 8b in that it permits the user to select more precisely the pivot point of platform 651f relative to its longitudinal position on reciprocating member 632f. This may have certain benefits by increasing or decreasing the amount of calf muscle involved in the exercise since pivotal orientation will be varied requiring lower leg muscle control to maintain the proper acute angular orientation as the foot platform 651f moves through substantially elliptical path 602.

Figure 9:
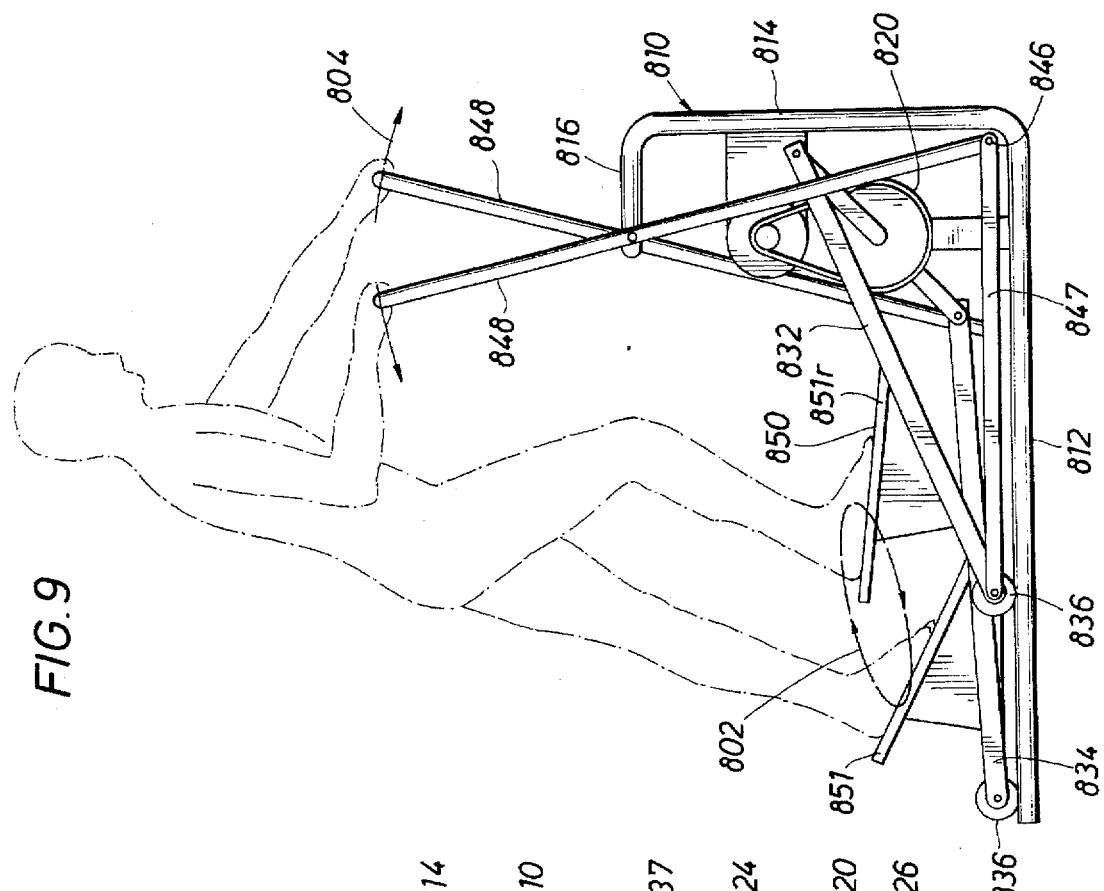
FIG. 9 is an elevation view of yet another further alternate embodiment of the present invention shown in FIG. 7.

Referring now to FIG. 9, an alternate embodiment of the version depicted in FIG. 7 is illustrated. As in the case of the previous embodiments, similar structure will be referred to with the same two-digit reference numeral but with a different prefix. In the case of FIG. 9, the designated structure has an 800 series prefix. Frame 810 comprises base portion 812, mid portion 814 and top portion 816. Once again, a coupling system 820 is shown identical to that in structure and function of coupling system 620 in FIG. 7. Moreover, reciprocating members 832 and foot contact members 850 and their interrelationship to coupling system 820 are identical to that depicted by elements 632, 650 and 620, respectively, of FIG. 7.

As in the case of the previous embodiments, operation of the device shown in FIG. 9 results in linear movement of first ends 834 of reciprocating members 832. The difference in this alternate embodiment, however, is a pair of linkage assemblies (one for each reciprocating member 832) comprising a first link 847 and a second link 848. One end of link 847 is attached to roller 836 of each reciprocating member 832. First link 847 is pivotally connected at pinned connection 846 to second link 848. Second link 848 is pivotally connected proximate its other end to the top portion 816 of frame 810. The end of second link 848 distal said pinned connection 846 includes a handle portion similar to handle portion 47 of FIG. 2. As in the case of the embodiment shown in FIG. 7, the user of the device shown in FIG. 9 easily ascends the device from the side or the rear, grabs the handle portion and begins to exert downward pressure on the foot contact members 850 in a stair climbing motion. As in the previous embodiments, this results in a smooth substantially elliptical motion of each foot of the user as shown by approximate ellipse 802. It also results in the exercising of certain muscle groups in the upper body through rotation of the hands along the arc in the direction of arrow 804.

What is claimed is:

1. An apparatus for exercising comprising:

a frame having a base portion adapted to be supported by a floor;

first and second reciprocating members, each reciprocating member having a first end and a second end;

a coupling member having (i) a pulley supported by said frame defining a pivot axis, and (ii) means for attaching the second ends of said first and second reciprocating members to said pulley so that rotation of said pulley results in the rotation of the second ends of said first and second reciprocating members in a substantially circular path about said pivot axis while the first ends of each of said first and second reciprocating members move in a reciprocating manner; and means for orienting the bottom of the feet of the user of the apparatus so that each foot of the user follows a substantially elliptical path during operation of the apparatus, said orienting means includes a pivotable platform for each foot of the user positioned substantially between the first and second ends of a corresponding reciprocating member and adapted to pivot within an acute angle relative to an axis extending from the first end of the corresponding reciprocating member to the second end of the same corresponding reciprocating member.

2. The exercising apparatus according to claim 1 wherein said coupler member attaching means comprises:

a first element attached at one end to said pulley proximate said pivot axis and at its other end to the second end of said first reciprocating member; and a second element attached at one end of said pulley proximate said pivot axis and at its other end to the second end of said second reciprocating member.

3. The exercising apparatus according to claim 1 wherein said frame further comprises a top portion adapted to provide hand support for the user of the device.

4. The exercising apparatus according to claim 1 wherein said first and second reciprocating members each include a platform support member pivotally supporting one of said platforms permitting the pivotal movement of the platform relative to a corresponding platform support member.

5. The exercising apparatus according to claim 4 wherein said orienting means further includes means for dampening the pivotal movement of each said platform relative to a corresponding platform support member.

6. The exercising apparatus according to claim 5 wherein said dampening means for each platform comprises (a) a linkage assembly pivotally attached at one end to one of said platforms distal said pivotal connection to said platform support member and pivotally attached at the other end of said linkage assembly to said corresponding reciprocating member proximate said first end of said reciprocating member, and (b) a spring for inhibiting the pivotal motion of said linkage assembly.

7. The exercising apparatus according to claim 4 wherein said reciprocating members each include a plurality of apertures proximate said first end of each reciprocating member permitting the adjustable engagement of the platform support member with said corresponding reciprocating member.

8. An exercising apparatus comprising:

a frame having a base portion adapted to be supported by a floor;

a first linkage assembly having a first reciprocating member and a first contact member, said first reciprocating member having a first end and a second end, the first end of said first reciprocating member adapted for reciprocating motion, said first contact member having a pivotable platform for the foot of the user positioned substantially between the first and second ends of said first reciprocating member and pivotable within an acute angle relative to an axis extending from the first end of said first reciprocating member to the second end of said first reciprocating member;

a second linkage assembly having a second reciprocating member and a second contact member, said second reciprocating member having a first end and a second end, the first end of said second reciprocating member adapted for substantially linear motion, said second contact member having a pivotable platform for the foot of the user positioned substantially between the first and second ends of said second reciprocating member and pivotable within an acute angle relative to an axis extending from the first end of said second reciprocating member to the second end of said second reciprocating member; and a coupling member having a pulley connected to said frame defining a pivot axis and means for attaching the second ends of said first and second reciprocating members to said pulley so that rotation of said pulley results in the rotation of the second ends of said reciprocating members in a substantially circular path about said pivot axis, wherein during operation of the apparatus, each foot of the user follows a substantially elliptical path.

9. The exercising apparatus according to claim 8 wherein said coupler member attaching means comprises:

a first element attached at one end to said pulley proximate said pivot axis and at its other end to the second end of said first reciprocating member; and a second element attached at one end to said pulley proximate said pivot axis and at its other end to the second end of said second reciprocating member.

10. The exercising apparatus according to claim 8 wherein said frame further comprises a top portion adapted to provide hand support for the user of the device.

11. The exercising apparatus according to claim 8 wherein said first and second reciprocating members each includes a platform support member pivotally supporting one of said platforms permitting the pivotal movement of the platform relative to a corresponding platform support member.

12. The exercising apparatus according to claim 11 wherein said orienting means further includes means for dampening the pivotal movement of each said platform relative to a corresponding platform support member.

13. The exercising apparatus according to claim 12 wherein said dampening means for each platform comprises (a) a linkage assembly pivotally attached at one end to one of said platforms distal said pivotal connection to said platform support member and pivotally attached at the other end of said linkage assembly to said corresponding reciprocating member proximate said first end of said reciprocating member, and (b) a spring for inhibiting the pivotal motion of said pivotal linkage assembly.

14. The exercising apparatus according to claim 11 wherein said reciprocating members each include a plurality of apertures proximate said first end of each reciprocating member permitting the adjustable engagement of the platform support member with said corresponding reciprocating member.

15. An exercising apparatus comprising:

a frame having a base portion adapted to be supported by a floor;

a first linkage assembly having:
(i) a first reciprocating member,
(ii) a first foot member, and
(iii) a first arm member, said first reciprocating member having a first end and a second end, the first end of said first reciprocating member adapted for substantially linear motion;

a second linkage assembly having:
(i) a second reciprocating member,
(ii) a second foot member, and
(iii) a second arm member, said second reciprocating member having a first end and a second end, the first end of said second reciprocating member adapted for substantially linear motion; and a coupling member having:
(i) a pulley supported by said frame defining a pivot axis; and
(ii) means for attaching the second ends of said first and second reciprocating members to said pulley so that rotation of said pulley results in the rotation of the second ends of said reciprocating members in a substantially circular path about said axis, said first foot member includes a pivotable platform adapted to support the foot of the user and positioned substantially between the first and second ends of said first reciprocating member and pivotable within an acute angle relative to an axis extending from the first end of said first reciprocating member to the second end of said first reciprocating member, said second foot member includes a pivotable platform adapted to support the foot of the user and positioned substantially between the first and second ends of said second reciprocating member and pivotable within an acute angle relative to an axis extending from the first end of said second reciprocating member to the second end of said second reciprocating member, wherein each foot of the user of the apparatus follows a substantially elliptical path.

16. The exercising device according to claim 15 wherein said coupler member attaching means comprises:

a first element attached at one end of said pulley proximate said pivot axis and at its other end to the second end of said first reciprocating member; and a second element attached at one end to said pulley proximate said pivot axis and at its other end to the second end of said second reciprocating member.

17. The exercising apparatus according to claim 15 wherein said first and second reciprocating members each include a platform support member pivotally supporting one of said platforms permitting the pivotal movement of the platform relative to a corresponding platform support member.

18. The exercising apparatus according to claim 17 wherein said orienting means further includes means for dampening the pivotal movement of each said platform relative to a corresponding platform support member.

19. The exercising apparatus according to claim 18 wherein said dampening means for each platform comprises (a) a linkage assembly pivotally attached at one end to one of said platforms distal said pivotal connection to said platform support member and pivotally attached at the other end of said linkage assembly to said corresponding reciprocating member proximate said first end of said reciprocating member, and (b) a spring for inhibiting the pivotal motion of said linkage assembly.

20. The exercising apparatus according to claim 17 wherein said reciprocating members each include a plurality of apertures proximate said first end of each reciprocating member permitting the adjustable engagement of the platform support member with said corresponding reciprocating member.

21. An exercise device comprising:

a frame having a base portion adapted to be supported by a floor;

first and second reciprocating members, each reciprocating member having a first end and a second end, the first ends of said first and second reciprocating members being adapted for substantially linear motion;

a coupling member having (i) a pulley supported by said frame defining a pivot axis, and (ii) means for attaching the second ends of said first and second reciprocating members to said pulley so that rotation of said pulley results in rotation of the second ends of said first and second reciprocating members in a substantially circular path about said axis;

first linkage assembly having a foot member and an arm member operatively associated with said frame, said foot member of said first linkage assembly includes a pivotable platform adapted to support the foot of the user and positioned substantially between the first and second ends of said first reciprocating member and pivotable within an acute angle relative to an axis extending from the first end of said first reciprocating member to the second end of said first reciprocating member; and second linkage assembly having a foot member and an arm member, said foot member of said second linkage assembly includes a pivotable platform adapted to support the foot of the user and positioned substantially between the first and second ends of said second reciprocating member and pivotable within an acute angle relative to an axis extending from the first end of the second reciprocating member to the second end of said second reciprocating member, wherein each foot of the user of the apparatus follows a substantially elliptical path and each arm of the user follows an arcuate path.

22. The exercising device according to claim 21 wherein said coupler member attaching means comprises:

a first element attached at one end to said pulley proximate said pivot axis and at its other end to the second end of said first reciprocating member; and a second element attached at one end to said pulley proximate said pivot axis and at its other end to the second end of said second reciprocating member.

* * * * *

UNITED STATES PATENT AND TRADEMARK OFFICE
CERTIFICATE OF CORRECTION

PATENT NO.   :  5,690,589
DATED        :  November 25, 1997
INVENTOR(S)  :  Robert E. Rodgers, Jr.

It is certified that error appears in the above-identified patent and that said Letters Patent is hereby corrected as shown below:

At claim 8, column 11, line 8, delete "substantially linear" and insert therefor --reciprocating--.

Signed and Sealed this

Twenty-fourth Day of February, 1998

Attest:

BRUCE LEHMAN

Attesting Officer    Commissioner of Patents and Trademarks